US009710978B1

(12) United States Patent
Sequeira et al.

(10) Patent No.: US 9,710,978 B1
(45) Date of Patent: Jul. 18, 2017

(54) ACCESS CONTROL SYSTEM USING OPTICAL COMMUNICATION PROTOCOL

(71) Applicants: Melwyn F. Sequeira, Plantation, FL (US); Hubert A. Patterson, Boca Raton, FL (US); Mohammad Mohiuddin, Boynton Beach, FL (US); Mark Antilla, Davie, FL (US)

(72) Inventors: Melwyn F. Sequeira, Plantation, FL (US); Hubert A. Patterson, Boca Raton, FL (US); Mohammad Mohiuddin, Boynton Beach, FL (US); Mark Antilla, Davie, FL (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 0 days.

(21) Appl. No.: 15/092,327

(22) Filed: Apr. 6, 2016

Related U.S. Application Data

(60) Provisional application No. 62/308,739, filed on Mar. 15, 2016.

(51) Int. Cl.
*H04B 10/00* (2013.01)
*G07C 9/00* (2006.01)
(Continued)

(52) U.S. Cl.
CPC ..... *G07C 9/00007* (2013.01); *H04B 10/1123* (2013.01); *H04B 10/80* (2013.01)

(58) Field of Classification Search
CPC ............. G07C 9/00007; H04B 10/114–10/118
(Continued)

(56) References Cited

U.S. PATENT DOCUMENTS

| 4,325,146 A | * | 4/1982 | Lennington ............. G01S 17/74 340/10.33 |
| 4,993,068 A | * | 2/1991 | Piosenka ................. G06F 21/32 235/380 |

(Continued)

FOREIGN PATENT DOCUMENTS

| CN | 203825788 U | 9/2014 |
| EP | 1901238 A2 | 3/2008 |

(Continued)

OTHER PUBLICATIONS

PCT International Search Report and Written Opinion of the International Searching Authority (EPO) for International Application No. PCT/US2016/031573 (dated Jan. 4, 2017).
Rais, N.H.M., et al., "A Review of Wearable Antenna," Antennas & Propagation Conference, 2009, LAPC 2009, Loughborough, Published IEEE; 978-1-4244-2720-8; DOI: 10.1109/LAPC.2009.5352373.
Hall, P.S., et al., "Antennas and Propoagation for Body Centric Communications," Proc. 'EUCAP 2006', Nice, France, Nov. 6-10, 2006 (ESA SP-626, Oct. 2006).
Conway, G.A., et al., "Antennas for Over-Body-Surface Communication at 2.45 GHz," IEEE Transactions on Antennas and Propagation, vol. 57, No. 4, Apr. 2009, 0018-926X, copyright 2009 IEEE.
(Continued)

*Primary Examiner* — Agustin Bello
(74) *Attorney, Agent, or Firm* — Fox Rothschild LLP; Robert J. Sacco; Carol E. Thorstad-Forsyth

(57) ABSTRACT

System for controlling access comprises a reader unit (108) which is disposed at a portal (102) to a controlled access area (118) and a wearable access device (WAD) (114) which is worn by a user (116). The reader and the WAD implement a bidirectional optical communication protocol (BOCP) to communicate digital data. The WAD receives an interrogation signal from the reader for initiating an access control interaction. At least one of the reader and the WAD uses a predetermined optical beam width (142, 308) and a boresight direction (140, 306) of an optical beam associated with the wireless optical communication link to facilitate a selective determination as to whether the WAD will respond to the interrogation signal with a reply signal to continue with the access control interaction.

22 Claims, 7 Drawing Sheets

(51) Int. Cl.
*H04B 10/80* (2013.01)
*H04B 10/112* (2013.01)

(58) Field of Classification Search
USPC ......... 398/106–114, 118–131; 340/5.1–5.92
See application file for complete search history.

(56) References Cited

U.S. PATENT DOCUMENTS

| | | | |
|---|---|---|---|
| 5,254,997 A | 10/1993 | Cohn | |
| 5,365,266 A | 11/1994 | Carpenter | |
| 5,387,993 A * | 2/1995 | Heller | G06K 7/0008 340/8.1 |
| 5,502,447 A * | 3/1996 | Kumpfbeck | H01Q 25/02 342/372 |
| 5,532,705 A | 7/1996 | Hama | |
| 5,763,868 A | 6/1998 | Kubota et al. | |
| 5,947,369 A | 9/1999 | Frommer et al. | |
| 5,960,085 A * | 9/1999 | de la Huerga | A61J 1/1437 235/380 |
| 5,966,227 A * | 10/1999 | Dubois | G01S 17/74 342/45 |
| 5,988,645 A | 11/1999 | Downing | |
| 6,219,439 B1 * | 4/2001 | Burger | G06F 21/32 235/380 |
| 6,288,644 B1 | 9/2001 | Mathews et al. | |
| 6,339,999 B1 | 1/2002 | Newell | |
| 6,346,886 B1 * | 2/2002 | De La Huerga | A61J 1/035 340/3.1 |
| 6,788,262 B1 | 9/2004 | Adams et al. | |
| 6,888,502 B2 | 5/2005 | Beigel et al. | |
| 6,950,098 B2 | 9/2005 | Brabander et al. | |
| 7,119,688 B2 * | 10/2006 | Wildman | B65F 1/0033 340/3.1 |
| 7,424,316 B1 | 9/2008 | Boyle | |
| 7,450,024 B2 * | 11/2008 | Wildman | A61B 5/1113 340/573.1 |
| 7,450,077 B2 | 11/2008 | Waterhouse et al. | |
| 7,629,934 B2 | 12/2009 | Rhodes et al. | |
| 7,696,882 B1 | 4/2010 | Rahimi et al. | |
| 7,849,619 B2 * | 12/2010 | Mosher, Jr. | A61B 5/117 40/633 |
| 7,898,385 B2 * | 3/2011 | Kocher | G07C 9/00087 340/5.52 |
| 7,982,616 B2 | 7/2011 | Banerjee et al. | |
| 7,983,565 B2 * | 7/2011 | Varshneya | G01S 7/481 398/118 |
| 8,267,325 B2 | 9/2012 | Phaneuf | |
| 8,430,310 B1 | 4/2013 | Ho et al. | |
| 8,447,188 B2 * | 5/2013 | Scott | G01S 17/74 398/169 |
| 8,497,808 B2 | 7/2013 | Wang | |
| 8,502,681 B2 * | 8/2013 | Bolling | G06F 19/327 340/539.1 |
| 8,599,101 B2 | 12/2013 | Christie et al. | |
| 8,646,695 B2 | 2/2014 | Worrall et al. | |
| 8,674,810 B2 | 3/2014 | Uysal et al. | |
| 8,917,214 B2 | 12/2014 | Forster | |
| 8,985,439 B2 * | 3/2015 | Braun | G06K 7/10 235/375 |
| 9,076,273 B2 | 7/2015 | Smith et al. | |
| 9,384,608 B2 * | 7/2016 | Strulovitch | G07C 9/00031 |
| 9,514,584 B1 * | 12/2016 | Burge | G07C 9/00007 |
| 9,519,853 B2 * | 12/2016 | Tolle | G06K 19/07758 |
| 9,600,999 B2 | 3/2017 | Stenzler | |
| 2002/0084904 A1 * | 7/2002 | De La Huerga | A61J 1/035 340/573.1 |
| 2002/0140558 A1 | 10/2002 | Lian et al. | |
| 2003/0005193 A1 * | 1/2003 | Seroussi | G07C 9/00087 710/107 |
| 2004/0085208 A1 * | 5/2004 | Fukuoka | G06K 7/10039 340/572.1 |
| 2004/0246103 A1 | 12/2004 | Zukowski | |
| 2005/0168340 A1 * | 8/2005 | Mosher, Jr. | A61B 5/117 340/572.8 |
| 2005/0285740 A1 | 12/2005 | Kubach et al. | |
| 2006/0022816 A1 | 2/2006 | Yukawa | |
| 2006/0219778 A1 | 10/2006 | Komatsu | |
| 2007/0182559 A1 | 8/2007 | Lawrence et al. | |
| 2008/0055045 A1 | 3/2008 | Swan et al. | |
| 2008/0074652 A1 | 3/2008 | Fouquet et al. | |
| 2009/0121931 A1 | 5/2009 | Katz | |
| 2009/0322513 A1 | 12/2009 | Hwang et al. | |
| 2010/0315244 A1 | 12/2010 | Tokhtuev et al. | |
| 2010/0328043 A1 | 12/2010 | Jantunen et al. | |
| 2011/0022121 A1 | 1/2011 | Meskins | |
| 2011/0148602 A1 | 6/2011 | Goh et al. | |
| 2011/0206378 A1 * | 8/2011 | Bolling | G08B 21/245 398/108 |
| 2011/0316700 A1 | 12/2011 | Kasahara et al. | |
| 2012/0056719 A1 | 3/2012 | Krishna et al. | |
| 2012/0189312 A1 * | 7/2012 | Maryfield | H04B 10/1143 398/108 |
| 2012/0234921 A1 | 9/2012 | Tiedmann et al. | |
| 2012/0242501 A1 | 9/2012 | Tran et al. | |
| 2012/0256492 A1 | 10/2012 | Song et al. | |
| 2012/0286927 A1 | 11/2012 | Hagl | |
| 2013/0010962 A1 * | 1/2013 | Buer | G07C 9/00007 380/270 |
| 2013/0027180 A1 * | 1/2013 | Lakamraju | G07C 9/00087 340/5.53 |
| 2013/0221938 A1 | 8/2013 | Conte et al. | |
| 2014/0077929 A1 | 3/2014 | Dumas et al. | |
| 2014/0159959 A1 | 6/2014 | Rhoads et al. | |
| 2014/0159975 A1 | 6/2014 | Apostolos et al. | |
| 2014/0226844 A1 | 8/2014 | Kerselaers | |
| 2014/0240087 A1 | 8/2014 | Liu et al. | |
| 2014/0327517 A1 * | 11/2014 | Portet | G01S 13/84 340/5.61 |
| 2014/0354494 A1 | 12/2014 | Katz | |
| 2014/0375429 A1 | 12/2014 | Cristache | |
| 2015/0022321 A1 * | 1/2015 | Lefevre | G06K 7/10079 340/10.1 |
| 2015/0041614 A1 | 2/2015 | Tran et al. | |
| 2015/0054696 A1 | 2/2015 | Werner et al. | |
| 2015/0070134 A1 * | 3/2015 | Nagisetty | G07C 9/00111 340/5.61 |
| 2015/0078741 A1 * | 3/2015 | O'Connor | H04B 10/116 398/23 |
| 2015/0149310 A1 | 5/2015 | He et al. | |
| 2015/0154486 A1 | 6/2015 | McFarthing et al. | |
| 2015/0168554 A1 * | 6/2015 | Aharoni | G01S 17/74 342/27 |
| 2015/0180716 A1 * | 6/2015 | Aminzade | H04L 41/0816 726/4 |
| 2015/0185160 A1 | 7/2015 | Lacoste et al. | |
| 2015/0188632 A1 * | 7/2015 | Aoyama | H04B 10/116 398/118 |
| 2015/0221147 A1 | 8/2015 | Daniel-Wayman et al. | |
| 2015/0250419 A1 * | 9/2015 | Cooper | A61B 5/6804 600/301 |
| 2015/0264431 A1 | 9/2015 | Cheng | |
| 2015/0280829 A1 * | 10/2015 | Breuer | G01C 3/08 398/118 |
| 2015/0339870 A1 | 11/2015 | Cojocaru et al. | |
| 2015/0341114 A1 * | 11/2015 | Pederson | H04B 10/40 398/128 |
| 2015/0365166 A1 * | 12/2015 | Deyle | H04B 10/116 398/118 |
| 2015/0379791 A1 | 12/2015 | Russell et al. | |
| 2016/0007315 A1 | 1/2016 | Lundgreen et al. | |
| 2016/0014103 A1 * | 1/2016 | Masters | G07C 9/00007 340/5.61 |
| 2016/0027226 A1 | 1/2016 | Gigl et al. | |
| 2016/0055692 A1 * | 2/2016 | Trani | G07C 9/00007 340/5.61 |
| 2016/0095189 A1 * | 3/2016 | Vangeel | F24F 11/006 315/152 |
| 2016/0164607 A1 * | 6/2016 | Pederson | H04B 10/1143 398/45 |

(56) References Cited

U.S. PATENT DOCUMENTS

| | | | | |
|---|---|---|---|---|
| 2016/0267760 A1* | 9/2016 | Trani | ............... | G08B 13/19695 |
| 2016/0284183 A1* | 9/2016 | Trani | ................. | G07C 9/00007 |
| 2016/0294835 A1* | 10/2016 | Beaumont | ............. | H04W 12/06 |
| 2016/0343187 A1* | 11/2016 | Trani | ................. | G07C 9/00119 |
| 2016/0344091 A1* | 11/2016 | Trani | ................. | G07C 9/00119 |
| 2017/0026118 A1* | 1/2017 | Pederson | ........... | H04B 10/1143 |

FOREIGN PATENT DOCUMENTS

| | | |
|---|---|---|
| EP | 1981183 A2 | 10/2008 |
| EP | 2495621 A1 | 9/2012 |
| WO | 9941721 A1 | 8/1999 |
| WO | 2014/113882 A1 | 7/2014 |
| WO | 2014210000 A1 | 12/2014 |
| WO | 2015/023737 A1 | 2/2015 |

OTHER PUBLICATIONS

Ito, K., et al., "Wearable Antennas for Body-Centric Wireless Communications," copyright IEEE 2010; 978-1-4244-6418-0/10.

Matthews, J.C.G., et al., "Body Wearable Antennas fo UHF/VHF," 2008 Loughborough Antennas & Propagation conference, 978-1-4244-1894-7/08, copyright 2008 IEEE.

\* cited by examiner

US 9,710,978 B1

ACCESS CONTROL SYSTEM USING OPTICAL COMMUNICATION PROTOCOL

CROSS-REFERENCE TO RELATED APPLICATIONS

This application claims the benefit of U.S. Patent Provisional No. 62/308,739, filed on Mar. 15, 2016, which is hereby incorporated by reference in its entirety.

FIELD OF THE INVENTION

This document relates generally to Access Control Systems ("ACSs") for restricted areas. More particularly, this document relates to ACSs using a Wearable Access Device.

BACKGROUND OF THE INVENTION

There are many ACSs known in the art. One such ACS comprises a plurality of Access Control Readers ("ACRs") mounted at exits and/or entries of restricted areas. For example, an ACR may be disposed adjacent to a doorway through which access to a restricted room is gained. A badge worn by a person is used to gain access to a restricted room via the ACR. In this regard, the badge comprises a Low Frequency ("LF") passive Radio Frequency Identifier ("RFID") communication device disposed thereon or therein. The LF passive RFID communication device typically operates at a frequency of 125 kHz. The ACR is a near field device with a detection range of about 5 cm or less.

Another conventional ACS employs beacons and wireless communication devices (e.g., mobile phones) which communicate via Bluetooth technology. A personal identifier is stored on the wireless communication device, and communicated to the beacon when the person is in proximity thereto. In response to the reception of the personal identifier, the ACS would allow the person to have access to the restricted area.

SUMMARY OF THE INVENTION

The present invention concerns a method and system for controlling access to a restricted area. The method involves using a wireless optical communication link between a reader associated with an access control system (ACS) and a wearable access device (WAD) worn by a user to selectively communicate an interrogation signal directed from the reader to the WAD for initiating an access control interaction. The method utilizes at least one predetermined optical beam width and a boresight direction of an optical beam associated with the wireless optical communication link to facilitate a selective determination as to whether the WAD will respond to the interrogation signal with a reply signal to continue with the access control interaction. According to further aspect, at least one predetermined optical beam width and boresight direction of the optical beam associated with the wireless optical communication link is used to facilitate a selective determination as to whether the reader will continue with the access control interaction after receiving the reply signal.

The wireless optical communication link is implemented using a high data rate bidirectional optical communication protocol (BOCP) to communicate digital data. For example, in an embodiment disclosed herein, the BOCP is implemented in accordance with a Light Fidelity (LiFi) optical communication standard.

A system for controlling access to a restricted area as described herein can comprise a reader unit which is disposed at a portal to a controlled access area and a wearable access device (WAD) which is worn by a user. The reader and the WAD are configured to implement a wireless optical communication link using a high data rate bidirectional optical communication protocol (BOCP) to communicate digital data. The WAD is configured to receive an interrogation signal from the reader for initiating an access control interaction. At least one of the reader and the WAD uses a predetermined optical beam width and a boresight direction of an optical beam associated with the wireless optical communication link to facilitate a selective determination as to whether the WAD will respond to the interrogation signal with a reply signal to continue with the access control interaction.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
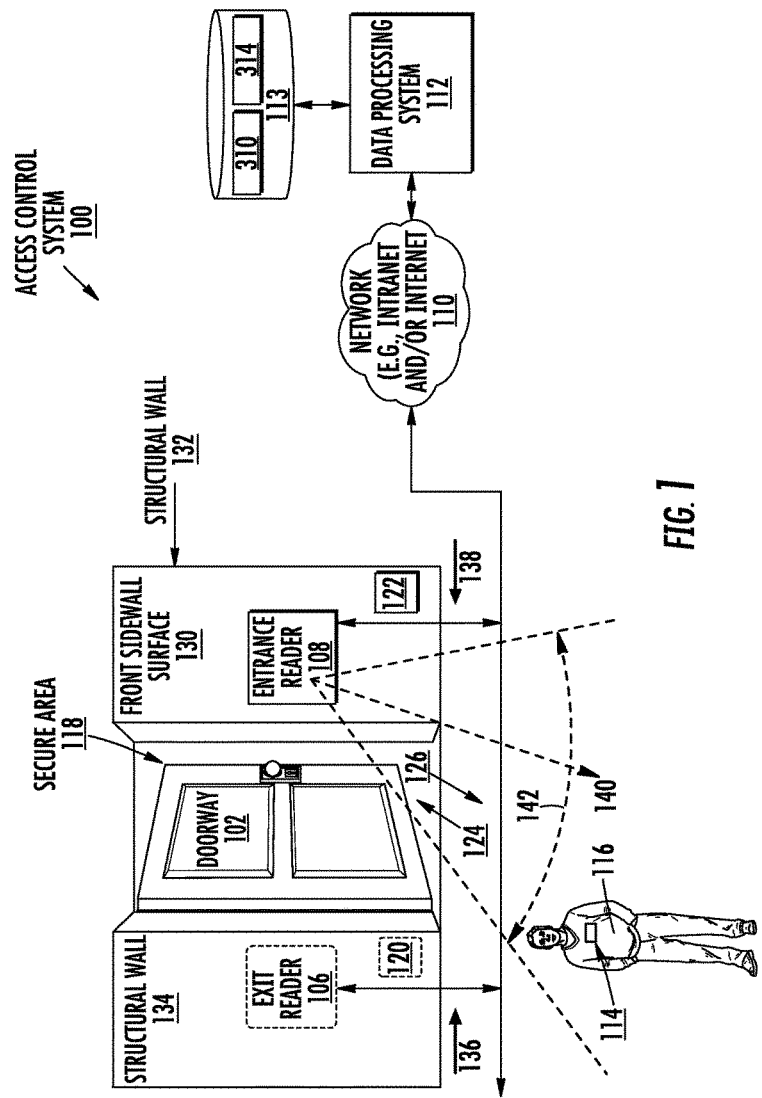
FIG. 1 is a perspective view of an exemplary ACS that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present invention provides a novel access control system ("ACS") implementing a method for controlling access to restricted areas. An ACS as described herein overcomes certain drawbacks of conventional access control systems. For example, conventional RF based access control systems are prone to RF interference which is ubiquitous within a conventional modern building. Such RF interference can cause disruption in the RF communications between an access control reader and a wearable authentication device. Moreover, RF communications can be severely impaired when a wearable authentication device comes in contact with the human body. A further problem with access control systems that use RF to communicate with a wearable authentication device concerns available data bandwidth. When using an RF type wearable authentication device, a data bandwidth of communications is limited to a theoretical limit of 1 Mbps—with a practical throughput of about 250 Kbps. In some wireless communications systems such as Bluetooth 2.0 EDR (Extended Data Rate), a theoretical data rate of 3 Mbps can be achieved; however, this is again severely limited in practice due to interferences in this band. As explained below, even these data rates are not adequate to transmit video images of a large number of people requesting access through an ACS. This puts a severe strain on the transmission of data and necessarily places limits on the use of such RF-based systems for certain types of higher level access control security features and features as hereinafter described.

Conventional RF based access control systems utilizing wearable authentication devices also suffer from problems associated with inadvertent interactions with the reader. Such inadvertent interactions occur typically when the user is walking parallel to an entryway to a secure area. In FIG. 1, such parallel direction would correspond to a direction as indicated by arrow 136 or 138). A person walking parallel to the entryway of a secure area 118 should not necessarily be presumed to be seeking entrance to a secure area 118. But for reasons that involve RF antenna beam width, a conventional ACS may still respond by "reading" the wearable authentication device. Consequently, when an individual walks along a corridor having a plurality of secure areas arranged in a manner similar to that shown in FIG. 1, a conventional ACS may grant access to each secure area 118 along the corridor as the individual walks by each doorway. This presents a serious security risk because it creates the possibility that an unauthorized person walking nearby could inadvertently be allowed access to the secure area.

Accordingly, there is illustrated in FIG. 1 an exemplary architecture for a novel ACS 100 which can overcome certain drawbacks of the prior art. The ACS 100 is generally configured to manage the entrance and/or exit of people through at least one secure area 118. In this regard, each secure area is entered and exited via an access point, such as a doorway 102. An entrance reader 108 is disposed on a front surface of a structure (e.g. a structural wall) located adjacent to the access point 102. For example, the entrance reader 108 can be disposed on a front sidewall surface 130 of a structural wall 132 located adjacent to the doorway 102. If an exit reader is provided, the exit reader 106 is also disposed on a surface of a structure (e.g. a structural wall) located adjacent to the access point 102. For example, an exit reader 106 can be disposed on a back sidewall surface (not shown in FIG. 1) of a structural wall 134 located adjacent to the doorway 102. The readers 106, 108 can be communicatively coupled to a Data Processing System ("DPS") 112 via a network (e.g., an Intranet and/or an Internet).

The DPS 112 can be located in the same facility as the reader 108 or in a different facility remote from the facility in which the reader 108 is disposed. As such, a network 110 can comprise an Intranet and/or the Internet. Additionally, each exit and/or entrance to a restricted area in each facility of an entity may have access control readers (not shown) similar to entrance and exit readers 106, 108 disposed thereat so as to define a distributed network of access control sensor systems. Such access control readers can also be communicatively connected to DPS 112 through network 110.

A wearable access device ("WAD") 114 is assigned to each individual authorized for accessing restricted areas, such as secure area 118. The WAD 114 comprises a wearable communications device that can be worn by the person 116 to which it is assigned. As shown in FIG. 1, WAD 114 comprises badge or security card with access control circuitry (not shown in FIG. 1). In some embodiments, the WAD 114 can include a suitable attachment mechanism (not shown in FIG. 1) such as a clip or a lanyard to facilitate attachment of the WAD to the individual to which it has been assigned. Further, although the WAD 114 can be configured as a badge or security card, it should be appreciated that the invention is not limited in this regard. The WAD 114 can be optionally be integrated in any other type of wearable item, such as a necklace, hat or clip-on item which can be worn on a person or on a person's clothing. In all scenarios, the WAD 114 facilitates the entrance and/or exit of the authorized person through the secure area 118.

Figure 2:
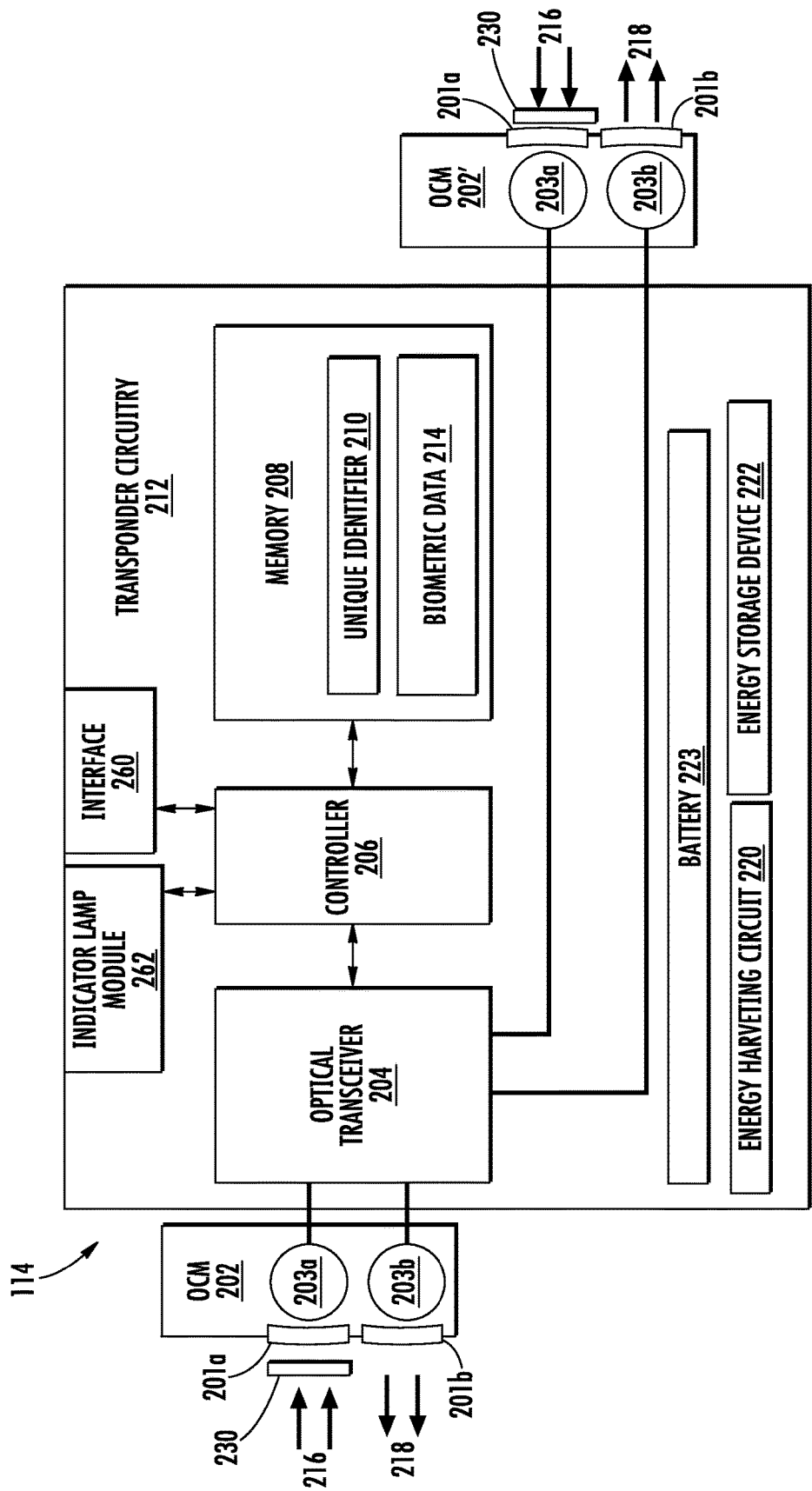
FIG. 2 is a block diagram of an exemplary architecture for the WAD of FIG. 1.

A schematic illustration of an exemplary architecture for the sensor circuitry of WAD 114 is provided in FIG. 2. As illustrated therein, the WAD 114 can include an optical communicator module (OCM) 202 electronically coupled to associated transponder circuitry 212. Each of these components will be described below in greater detail.

The OCM 202 will comprise an optical receiving element 203a and a lamp 203b. The OCM 202 can optionally include beamforming elements 201a, 201b to control received light 216 which has been received by the optical receiving element 203a or transmitted light 218 which has been emitted by lamp 203b. For example, the beamforming elements can control a range of azimuth angles which define an optical beam width or gain pattern of the OCM 202. Since separate beamforming elements can be utilized for receive and transmit operations, the receive and transmit patterns can be different. The beamforming elements can include any suitable optical components which are now known or known in the future to facilitate control gain pattern for light which is received by the optical receiving element 203a and/or optical beam transmitted by the lamp 203b. In FIG. 2, the beamforming elements are shown in the form of a lens, but it should be understood that a beamforming element as described herein can also include a reflector. The beamforming element can be arranged to function alone or in conjunction with the lens.

According to one aspect, the optical receiving element 203a can be a solid state photodiode which shows a suitable response to light in a wavelength region corresponding to the operation of the WAD 114 as hereinafter described. For example, the photodiode selected for this purpose can be responsive to light in a visible wavelength region or an invisible wavelength region. According to one aspect, the OCM 202 can include one or more optical filters 230 which can selectively filter incoming light to exclude certain optical wavelengths. The lamp 203b can be comprised of a solid state light emitting device (LED).

The OCM 202 is advantageously arranged on the WAD 114 to receive and transmit photonic energy in a direction away from the person's body when the WAD 114 is being worn by an individual. The OCM 202 is coupled to transponder circuitry 212 which implements an access control method as described herein. The transponder circuitry 212 includes, but is not limited to electronic circuitry to facilitate a wireless optical communication link in accordance with a bidirectional optical communication protocol ("BOCP"). As such, the transponder circuitry 212 can include an optical transceiver 204, a controller 206 and a memory device 208. The transponder circuitry can also optionally include a data interface 260 which can be used for programming the WAD 114 and/or to facilitate storing therein certain data as hereinafter described. The WAD 114 can further include one or more of a battery 223, an energy harvesting circuit 220, and an energy storage device 222.

The OCM 202 is electronically coupled to the optical transceiver 204. The optical transceiver includes receiver circuitry (not shown) configured to facilitate the BOCP by processing and detecting electronic signals generated by the optical receiving element 203a in response to received optical energy. The optical transceiver 204 also includes lamp drive circuitry (not shown) to selectively control the operation of the lamp 203b in response to digital data signals (e.g. digital data signals received from the controller 206).

In some scenarios, it can be advantageous to include in WAD 114 a second OCM module which is shown in FIG. 2 as OCM 202'. The OCM 202' can be similar to the OCM 202, but located on an opposing side of the badge or card comprising the WAD 114. Accordingly, the description above with respect to OCM 202 is sufficient for understanding OCM 202'. If included, the purpose of the OCM 202' is to facilitate optical communications from either a front face of a security card comprising the WAD 114 or an opposing back face of the security card. Accordingly, the wireless optical communications described herein can be carried out regardless of which face of the card is oriented away from the wearer. Control over which OCM is utilized can be managed by the controller 206 based on information received from the OCM. For example, such information can include a relative amounts of optical energy associated with optical signals received from each OCM.

Controller 206 is comprised of a suitable microcontroller, processor (e.g. a microprocessor) or other type of control circuitry to control the operations of the transponder circuitry 212. Accordingly, the controller 206 can process digital data signals received from optical transceiver 204 as a result of BOCP receiving operations. In response, the controller 206 can generate digital data signals to be communicated using optical transceiver 204 in accordance with the BOCP transmit operations. As part of such receive and transmit operations, the controller 206 can access certain data as hereinafter described which is contained in the memory device 208. Memory device 208 can also include instructions (e.g., computer software and/or firmware) for controlling the operation of controller 206 whereby the access control processes and methods described herein can be carried out. Controller 206 also controls communications to DPS 112 through network 110 by utilizing network interface 260.

The WAD 114 can also include an indicator lamp module 262 which includes one or more indicator lamps and associated lamp drive circuitry. The indicator lamp module is under the control of the controller 206 and can be used to indicate certain conditions associated with access control operations as described below. For example, the indicator lamp module can include an indicator lamp (e.g. an LED) to visibly indicate whether or not a user has been granted access to a secured area. According to one aspect the indicator lamp module can include two different color lamps (e.g. red and green). The green lamp can be illuminated when the user has received proper access authorization and the red lamp can be illuminated when the user has not received proper access authorization. This feature can facilitate clearly singling out to security personnel those users who are not authorized to enter a secured area.

According to one aspect, the BOCP can comprise a wireless optical communication protocol which is sometimes referred to as Light Fidelity ("LiFi"). As is known, LiFi is a bidirectional optical communication protocol that facilitates high speed and fully networked wireless communication using a wavelength region comprising visible, infra-red, and/or near ultraviolet light. Accordingly, the transponder circuitry 212 can facilitate communication of a unique identifier 210 to the reader 108 using a BOCP reply signal. The BOCP reply signal is generated by the controller 206 in response to BOCP interrogation signals sent from reader 108. The unique identifier 210 is then used by the reader 108 and/or DPS 112 to automatically identify the person 116 which is in proximity to the access point 102 and/or determine whether the person is authorized to access the restricted area. In some scenarios, the BOCP reply signal can also include certain biometric information (e.g. facial image data, iris scan data or other biometric data) associated with the person to whom the WAD 114 is assigned.

As shown in FIG. 2, the WAD 114 advantageously includes a battery 223 or other suitable power source to power the access control circuitry associated with the sensor as hereinafter described. The battery can comprise the sole power source for the WAD 114 but in many scenarios it is advantageous to also includes an energy harvesting circuit 220 for deriving energy from an external source to power other electronic components 204, 206, 208, 260 internal to WAD 114. According to one aspect, the energy harvesting circuit can be configured to harvest energy which is present within the surrounding environment from equipment disposed at an access point of a restricted area. In some scenarios, the energy harvesting circuit can be configured to harvest photonic energy (light). The photonic energy used for this purpose can have a frequency chosen so that it is invisible to humans, although the invention is not limited in this regard. In other scenarios, the energy can be collected from an electromagnetic field emitted within a surrounding environment from field generators 120, 122 disposed at an access point of a restricted area. The energy collected by the energy harvesting circuit 220 is stored in an energy storage device 222 (e.g., a capacitor) for later use in electronic components 204, 206, 208, 260. The energy storage device 222 accumulates charge as it is carried from one access point to another access point within a facility. Alternatively, the energy from the energy harvesting circuit can be stored in the battery 223 which powers other electronic components 204, 206, 208, 260 internal to WAD 114. In scenarios where energy storage device 222 does not provide sufficient energy required to power the circuits associated with the WAD, the battery 223 can provide a supplemental source of energy.

Figure 3:
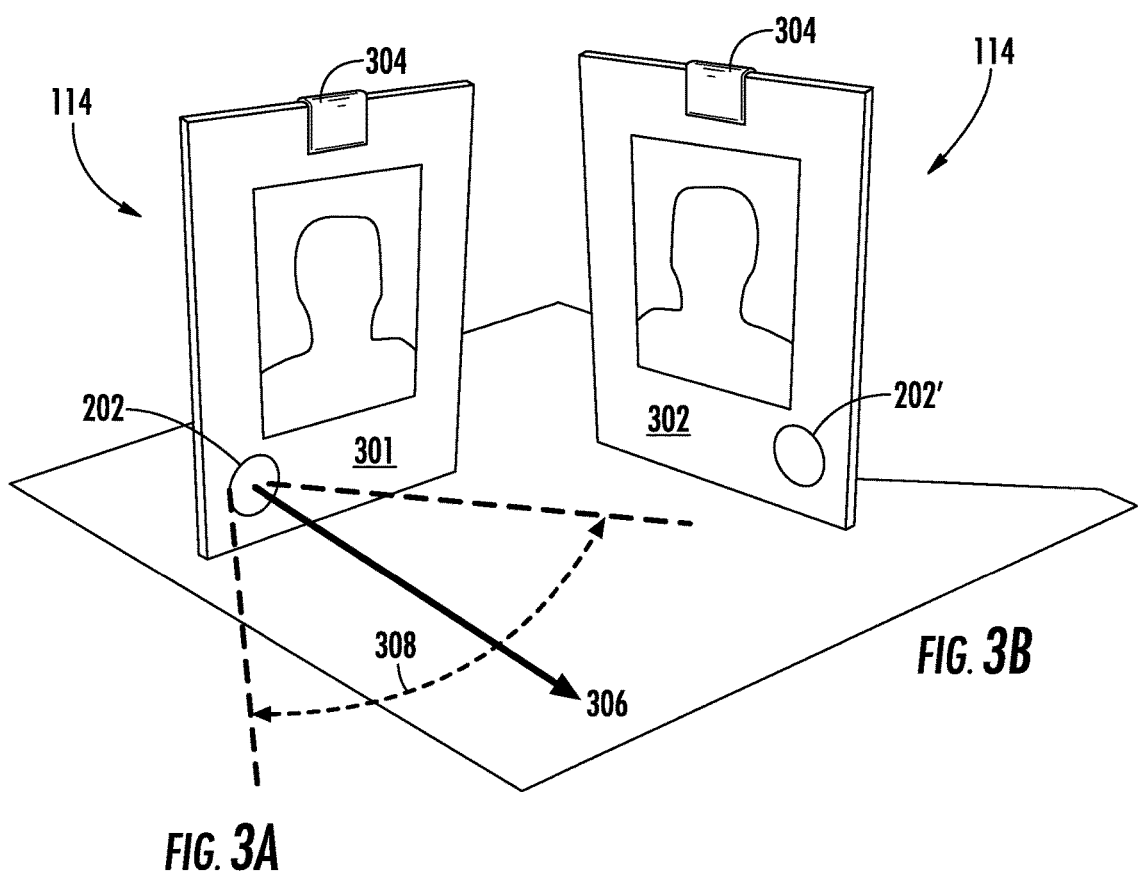
FIGS. 3A-3B collectively show to opposing sides of an exemplary WAD.

Referring now to FIGS. 3A and 3B there is shown front 301 and rear 302 of an exemplary WAD 114 in the form of a security card which can be attached to the clothing of a person 116. It can be observed in FIGS. 3A and 3B that the WAD can include an OCM module 202 on the front side 301. A second OCM module 202' is optionally included on the rear side 302 of the security card. FIG. 3 also illustrates how at least one indicator lamp 304 associated with an indicator lamp module (e.g., indicator lamp module 262 as shown in FIG. 2) can be provided so that it is visible externally on the WAD 114.

Figure 4:
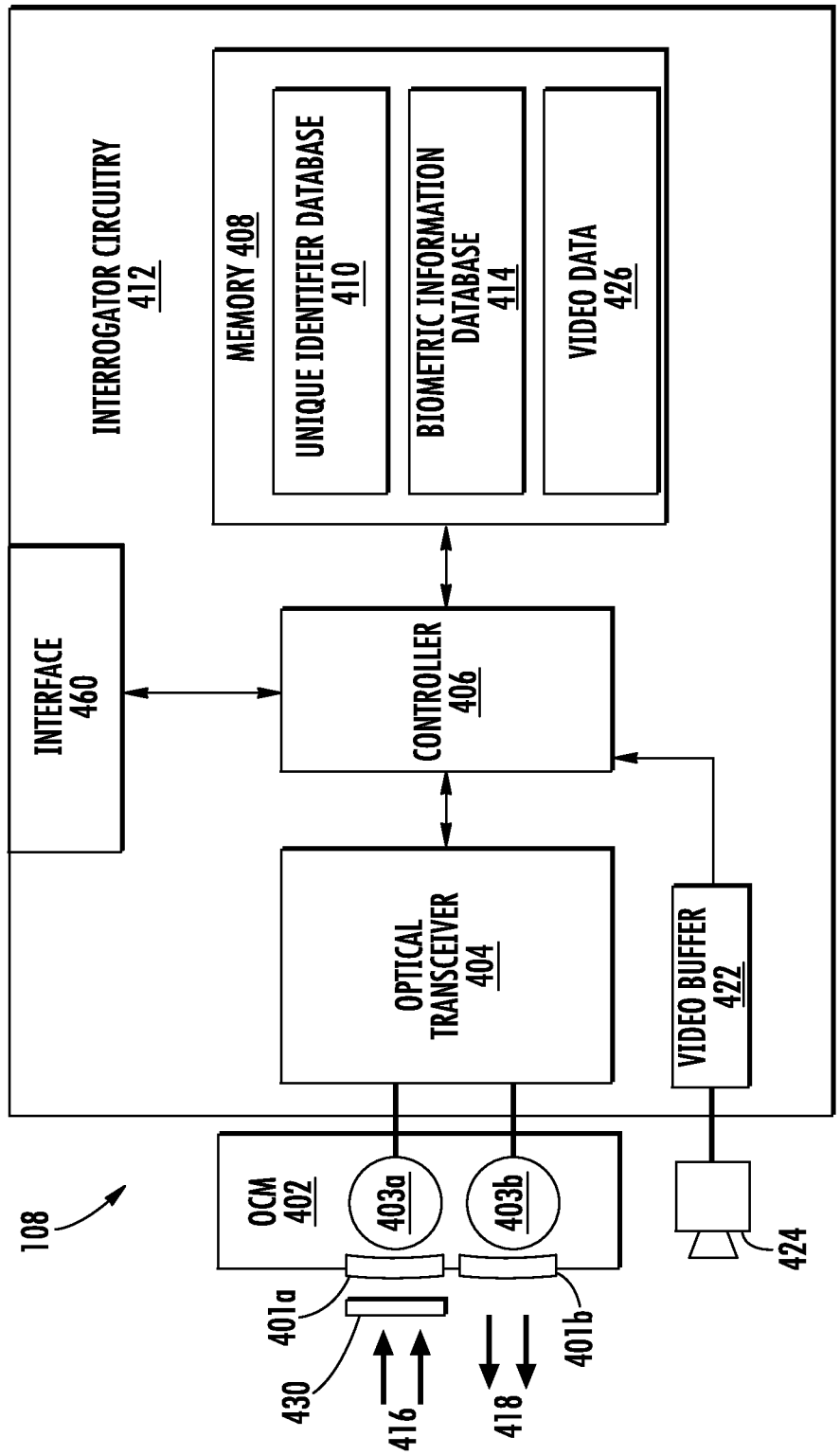
FIG. 4 is block diagram that is useful for understanding an exemplary architecture of a ACS reader.

Referring now to FIG. 4, there is provided an exemplary block diagram showing certain details of an entrance reader 108. The exit reader 106 can have a similar configuration to that of the entrance reader 108. Accordingly, the description provided below is also sufficient for understanding the exit reader 106.

As shown in FIG. 4, entrance reader 108 can include an OCM 402 coupled to interrogator circuitry 412. The OCM 402 can be similar to the OCM 202 insofar as it includes an optical receiving element 403a and a lamp 403b. The OCM 402 can also include beamforming elements 401a, 401b to control a beam of received light 416 which has been received by the optical receiving element 403a or a beam of transmitted light 418 which has been emitted by lamp 403b. For example, the beamforming elements can control a range of azimuth angles which define an optical beam width or gain pattern of the OCM 402. Since separate beamforming elements can be utilized for receive and transmit operations, the receive and transmit patterns can be different. Since the entrance reader 108 will usually be mounted in a stationary configuration, the various components of the OCM 402 can be larger and more substantial compared to the corresponding elements which are provided in the WAD 114 (which must be carried by a user). Accordingly, the optical receiving element 403a, lamp 403b and beamforming elements 401a, 401b can be of a different configuration as compared to that utilized in the WAD 114.

According to one aspect, the OCM 402 can include one or more optical filters 430 which can selectively filter incoming light to exclude certain optical wavelengths. The optical filters can be used to ensure that the OCM 402 only processes optical signals of certain wavelengths (e.g. optical wavelengths transmitted by the WAD 114). Using optical filters at either the reader or the WAD or both, the system described herein can wirelessly communicate with the WAD or any other wearable authentication device, at different frequencies or wavelengths using optical filters at either the reader or the badge. For example, the reader could transmit to the badge at 480 nm (blue wavelength) and receive from the badge at 560 nm (green wavelength) or 680 nm (red wavelength) to detect unauthorized users. This can enhance the seamless, reliable and interference free communications between the reader and the wearable(s).

The reader 108 can be powered by a suitable battery (not shown). However, since the reader 108 is a stationary unit mounted to what will usually be a fixed location, it can be more advantageous to power the reader directly from wiring associated with a building structure in which the secure areas 118 is located. In some scenarios, the reader 108 can use a battery as a back-up power source in the event of a power outage.

In some embodiments, the reader 108 can further include a video camera 424 which records images of persons approaching the reader. The output of the video camera can be communicated to a video buffer where it can be accessed by the controller 406 for purposes which are described below in further detail. In some scenarios, the controller 406 may store video data collected by the video camera in memory 408. In some scenarios, the video camera 424 can be used to also perform the functions associated with the optical receiving element 403a as hereinafter described.

The interrogator circuitry 412 implements an access control method as described herein. The interrogator circuitry 412 includes, but is not limited to electronic circuitry to facilitate a wireless optical communication session in accordance with a BOCP as described above. As such, the interrogator circuitry 412 can include an optical transceiver 404, a controller 406, a memory device 408, and a network data interface 460. The optical transceiver 404 is electronically coupled to the OCM 402.

The optical transceiver includes receiver circuitry (not shown) configured to facilitate the BOCP by processing and detecting electronic signals generated by the optical receiving element 403a in response to received optical energy. The optical transceiver 404 can also include lamp drive circuitry (not shown) to selectively control the operation of the lamp 203b in response to digital data signals (e.g. digital data signals received from the controller 406).

Controller 406 is comprised of a suitable microcontroller, processor (e.g. a microprocessor) or other type of control circuitry to control the operations of the interrogator circuitry 412. Accordingly, the controller 406 can control optical transceiver 404 to generate certain BOCP interrogation signals directed at the WAD 114 to cause the WAD to transmit its unique identifier 210. In some embodiments described herein, the interrogation signal can also cause the WAD 114 to transmit biometric data 214. In some scenarios, the controller 406 can also be configured to cause optical transceiver 404 to generate additional command and control signals directed to the WAD 114 as hereinafter described.

The controller 406 can process digital data signals received from optical transceiver 404 as a result of BOCP receiving operations. As part of such receive operations, the controller 406 can access certain data to facilitate access control operations. This data can be at least partially contained in the memory device 408. For example, the controller 406 can compare a unique identifier 210 received from the WAD 114 to information contained in unique identifier database 410 to determine whether a person carrying the WAD 114 is permitted to have access to the secure area 118. If the WAD 114 has provided biometric information to the reader 108, then the controller 406 can also access the biometric information database 414 to evaluate whether certain biometric information which is collected at the reader. Memory device 408 can also include instructions (e.g., computer software and/or firmware) for controlling the operation of controller 406 whereby the access control processes and methods described herein can be carried out.

Controller 406 advantageously controls communications to DPS 112 through network 110 by utilizing network interface 460. The controller 406 can use the interface to report security violations, operational status, traffic count information and so on to DPS 112. The controller 406 can also be used to receive messages, data and other communication (e.g. authentication command and control messages) from DPS 112.

In some embodiments, the one or both of the unique identifier database 410 and the biometric information database can optionally be stored in a data storage device 113 associated with the DPS 112. The storage of this information in data storage device 113 can be in addition or an alternative to the storage of such data in memory 408 of the entrance reader 108. In such embodiments, the entrance reader 108 can communicate unique identifier information and/or biometric data to the DPS 112. The DPS 112 can then compare such information to information contained in the data storage device 113 to determine whether a person carrying a particular WAD 114 should be granted access to the secure area 118. Based on such evaluation, the DPS 112 then communicates access control information to the controller 406 through the network interface 460. The communication can include the results of such evaluation and/or whether the person is to be permitted access.

Figure 5:
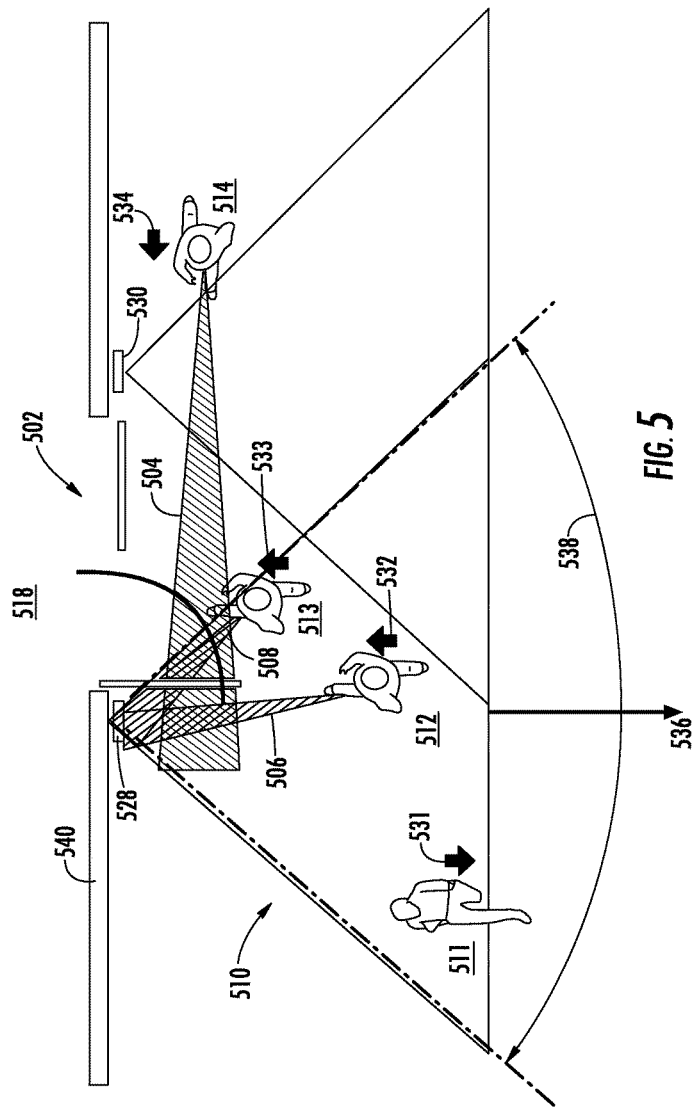
FIG. 5 is a schematic drawing which is useful for understanding certain advantages associated with an ACS as described herein.

Referring now to FIG. 5, there is shown a drawing that is useful for understanding certain advantages of the various embodiments described herein. In FIG. 5 there is schematically illustrated a secured area 518 which is accessed through a doorway 502. One or more entrance readers 528, 530 control access to the secured area 518 by performing a BOCP interaction with users 511, 512, 513, 514 carrying WADs (not shown in FIG. 5). For purposes of this description it should be assumed that each WAD is attached to a front of a user's body so it faces outwardly in their direction of their forward travel as indicated by arrows 531, 532, 533 and 534.

Beam width of light sources and field of view of optical sensors can be tightly controlled. Received signals that are not within a field of view of an optical sensor will not be received (or will be received at very low signal strength). Accordingly, a WAD 114 as described herein can be made to be very selective with regard to those directions from which it will respond to optical signals. Likewise, an access control reader can be made to be very selective with regard to those directions from which it will respond to transmitted optical signals. This feature can be used to prevent an access control reader from interacting with users who are walking in a direction parallel to an entryway (e.g. doorway 502) of an access controlled area 518.

Referring once again to FIG. 5, it can be observed that users 512, 513 walking toward reader 528 in directions 532, 533 are within a predetermined range of azimuth angles defined by an optical beam 510 of the reader. Accordingly, a WAD which is worn on the front side of each user 512, 513 will detect a relatively strong optical interrogation signal from the reader 528 and will respond to same. Conversely a WAD worn by a user 511 who is also within the optical beam 510 but facing away from the reader 528 will not receive interrogation signals from the reader 528 (or will receive them only at very low amplitude levels). Similarly, a WAD worn on the front of a user 514 walking orthogonally to the boresight direction 536 of the beam 510 will not receive any optical signals from the reader 528 (or will receive signals at a relatively low signal strength level) and will therefore not respond to interrogation signals.

A WAD attached to a user walking directly toward the reader 528 would receive a stronger optical signal from the reader as compared to a user walking away from the reader. Similarly, a WAD attached to a user who is walking toward the reader would receive a much stronger optical signal from the reader as compared to the case where a user is walking transversely to a boresight direction of a reader optical beam. This difference in received signal strength is used to differentiate when a request for access is being made by a user. A WAD attached to a user walking away from a reader 528 or orthogonal to a boresight direction 536 of the reader optical beam would receive an interrogation signal from the reader at a relatively low signal level (if at all). In such a scenario, the WAD would not detect the interrogation signal (or would not respond to interrogation signals due to their low signal strength level). Accordingly, the WAD would not begin access negotiations with the reader and would not trigger inadvertent opening or unlocking of the doorway.

But in the event that the WAD did respond to such interrogation signals, then its own transmitted optical beam would generally be directed away from (or orthogonal to) the boresight direction 536 of the reader 528. Consequently, the WAD reply signal would not be received by the reader (or would be received at a low signal strength level and on that basis would be discarded or ignored by the reader). Accordingly, the arrangement described herein can minimize the possibility that persons other than those walking toward the doorway 502 will engage in a BOCP interrogation/response session with the reader 528.

Figure 6:
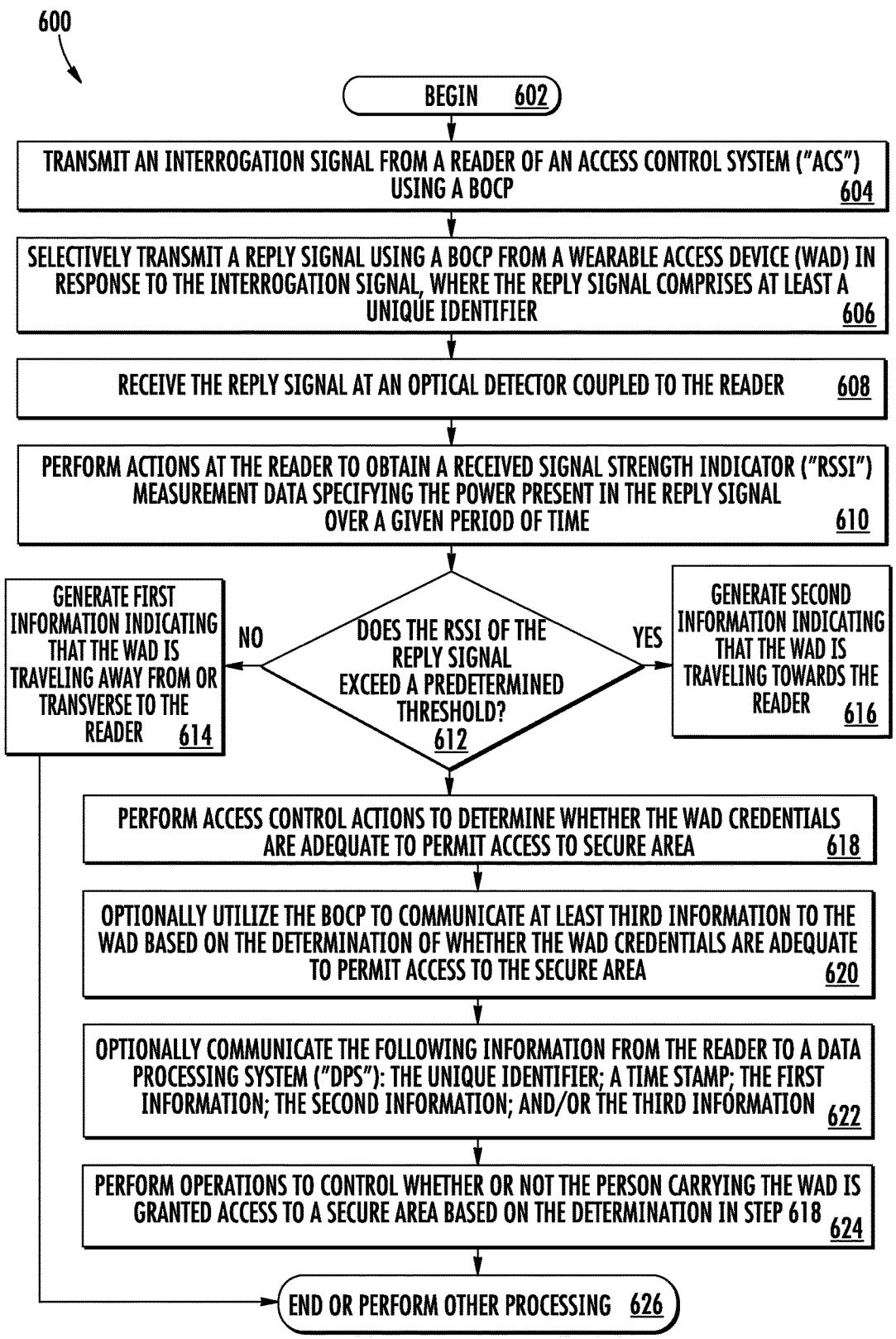
FIG. 6 is a first flow diagram which is useful for understanding a method for controlling access to a restricted area.

Referring now to FIG. 6, there is provided a flow diagram of an exemplary method 600 for controlling access to a restricted area. As shown in FIG. 6, method 600 begins with step 602 and continues with step 604 where an interrogation signal is transmitted from a reader (e.g., reader 108 of FIG. 1) which is associated with an ACS (e.g., ACS 100 of FIG. 1). The interrogation signal is transmitted (e.g. periodically transmitted) using a wireless optical signal transmission method (i.e., BOCP). In response to the interrogation signal, a reply signal may be transmitted in accordance with the BOCP from a WAD (e.g., WAD 114 of FIGS. 1-3). The operation of the WAD 114 is described below in greater detail with respect to FIG. 7. In general, however, a reply signal may be transmitted if the WAD 114 is within a beam width of a reader optical beam used to transmit the interrogation signal and the WAD is moving in a direction toward the reader (e.g. direction 124 in FIG. 1 and directions 532, 533 in FIG. 5).

The BOCP reply signal transmitted from the WAD comprises at least a unique identifier (e.g., unique identifier 210 of FIG. 2). The unique identifier will generally be a predefined value which is associated with the person to whom the WAD 114 has been assigned. In some embodiments the BOCP reply signal will also include biometric data 214 corresponding to the person 116 to whom the WAD 114 has been assigned. For example, in some embodiments, the biometric data comprises image data (e.g. facial image data or iris scan data) suitable to facilitate a biometric recognition comparison relative to stored data. Notably, the high data rate associated with a BOCP as described herein is a key facilitator of the high speed data transfer as between the WAD 114 to the reader 108. It should be noted that transfers of certain types of biometric data, such image data, would not be practical using conventional methods for communicating in this context. For example, practical data rate limitations associated with an RF based Short Range Communication ("SRC") protocol dictate that it is insufficient for this purpose.

In step 608, the BOCP reply signal (if transmitted by the WAD) will be received at an optical receiving element (e.g., optical receiving element 403*a*) associated with reader 108 of FIG. 1, provided that the receiving element is within a beam width of the optical beam transmitted by the WAD. If a reply signal from the WAD is received at the reader, actions are performed by the reader to obtain a received signal strength indication ("RSSI") measurement data. The RSSI measurement data will specifying the power present in the BOCP reply signal over a given period of time, as shown by step 610.

In step 612 the RSSI measurement data is used by the reader to determine if the signal strength of the reply message corresponds to the RSSI that would be expected from a WAD worn by a person who is approaching the reader (e.g. in a direction 124 as shown in FIG. 1 or directions 532, 533 shown in FIG. 5) within a predetermined distance and predetermined range of azimuth angles 538 relative to a reader boresight direction (e.g. boresight direction 140 in FIG. 1 or 536 shown in FIG. 5). This boresight direction will usually be aligned orthogonally to a plane defined by the doorway to the secure area. However, the invention is not limited in this regard and the boresight direction can vary somewhat depending on the particular reader installation and doorway configuration. The range of azimuth angles 142 referenced herein will generally correspond to beam width of the optical beam that is used to transmit the interrogation signal. Notably, the determination made in step 612 can alternatively be performed by a DPS (e.g., DPS 112 of FIG. 1). In this case, method 600 can be amended accordingly. Such changes are understood by persons skilled in the art.

If the signal strength of the BOCP reply signal does not exceed a predetermined threshold [612:NO], then step 614 is performed where first information is generated indicating that the WAD is traveling away from or transverse to the reader. At this point the processing can end (or continue with other processing in step 626). In some embodiments the first information and the unique identifier information can also be logged (e.g., in the reader memory 408 or in the data store 113 associated with DPS 112). In contrast, if the signal strength of the BOCP reply signal does exceed a predetermined threshold [612:YES], then step 616 is performed where second information is generated indicating that the WAD is traveling in approaching in a direction toward the reader within the reader beam width (i.e., within a predetermined range of azimuth values relative to reader boresight).

Upon completing step 616, the method 600 continues with step 618. Step 618 involves performing access control actions to determine whether the credentials (unique identifier and/or biometric data) communicated by the WAD are adequate to permit access to the secure area. This step can be performed in the reader (e.g., reader 108) or in the data processing system (e.g. data processing system 112). In some embodiments, this step can involve a simple comparison of unique identifier value received from the WAD with a set of stored values contained in a unique identifier database (e.g. unique identifier database 410). However, as a further security measure it is advantageous to also compare biometric information received from the WAD with biometric data with biometric data captured at the reader. For example, a biometric scanner such as video camera 424 can capture biometric information such as facial recognition data (or iris scan data). This captured biometric data can be compared to the biometric data (e.g. biometric data 214) communicated from the WAD to the reader. This comparison can be used to determine whether the person who is carrying the WAD is the same person to whom the WAD was originally assigned. In some embodiments, the biometric data can also be compared to biometric information contained in a biometric information database (e.g. biometric information database 414). This can ensure that the information contained on the WAD has not been altered so as to change the biometric information contained therein to correspond with a person other than the person to whom it was originally assigned.

Thereafter, the process continues to optional step 620 which involves utilizing the BOCP optical data link to communicate at least a third information from the reader to the WAD based on the determination in step 618. This third information can comprise any control signal or data which is deemed useful for an access control process as described herein. For example, in some embodiments, the third information can comprise an instruction to illuminate a lamp associated with the WAD (e.g. a lamp associated with indicator lamp module 262). A red lamp could indicate that a security violation has occurred and the person is not permitted to access a secure area. A green lamp could indicate that no security violation has occurred and the person is authorized to be in the secure area. This feature can facilitate quick visual identification of security violations by security personnel. According to another aspect, the third information can include access control data such as security violations associated with the particular WAD. The security violation can be accessed from the WAD at a later date and/or can be used to disable the WAD from further use as a result of such violation.

The process continues in step 622 in which the reader optionally communicates certain information from the reader to the DPS. For example, the information can include the unique identifier; a time stamp; the first information; the second information; and/or the third information. If step 618 is performed at the DPS rather than at the reader, then this step may not be necessary as the DPS will already have access to such information. In that case, the DPS may instead communicate to the reader the results of the access control determination performed in step 618.

In step 624, the process continues by the ACS performing operations to control whether or not the person carrying the WAD is granted access to the secure area based on the determination in step 618. These operations can be performed by processing elements located at the reader, the DPS or a combination of the two. Step 624 can involve various ACS functions such as electronically unlatching a door, disabling a security system, and/or automatically controlling the opening or closing of a door. Thereafter step 626 is performed where method 600 ends or other processing is performed.

Figure 7:
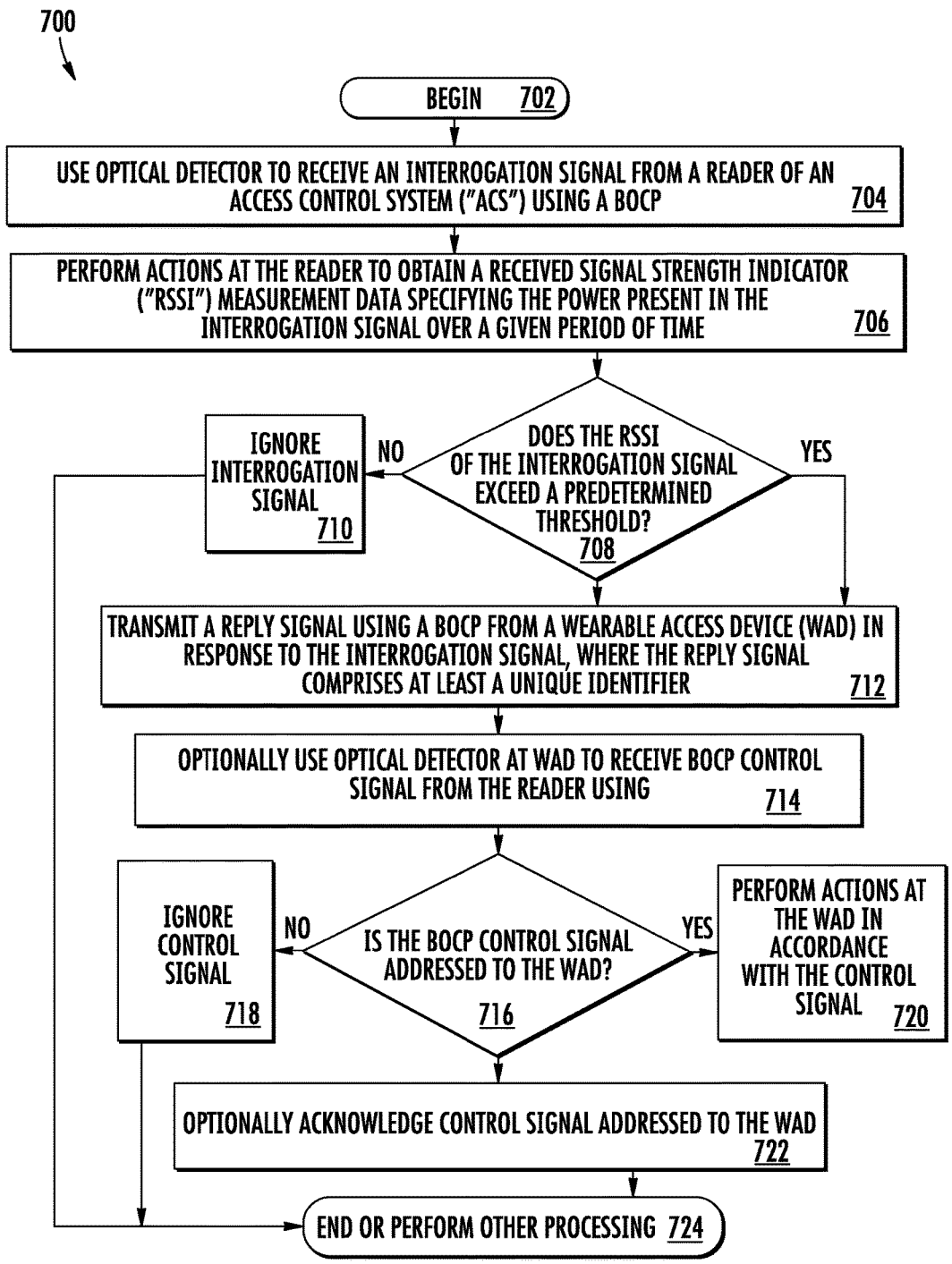
FIG. 7 is second flow diagram which is useful for understanding a method for controlling access to a restricted area.

The operations of the WAD will be described in further detail with respect to the flowchart shown in FIG. 7. The method 700 begins with step 702 and continues with step 704 where the WAD utilizes an optical detector to receive an interrogation signal from a reader (e.g., reader 108 of FIG. 1) which is associated with an ACS (e.g., ACS 100 of FIG. 1). The BOCP interrogation signal will be received at an optical receiving element (e.g., optical receiving element 203*a*) associated with the WAD, provided that the receiving element is within a beam width of the optical beam transmitted by the reader. If the interrogation signal is received at the WAD, actions can be performed by the WAD to obtain a received signal strength indication ("RSSI") measurement data. The RSSI measurement data will specify the power present in the BOCP interrogation signal over a given period of time, as shown by step 706.

In step 708 the RSSI measurement data is used by the WAD to determine if the signal strength of the interrogation message corresponds to the RSSI that would be expected from a reader when a person is approaching the reader (e.g. in a direction 124 as shown in FIG. 1 or directions 532, 533 shown in FIG. 5). The threshold value can be set to correspond to an RSSI which would be expected for a reader within a predetermined distance and predetermined range of azimuth angles (e.g. azimuth angle 308 in FIG. 3A) relative to a WAD boresight direction (e.g. boresight direction 306 in FIG. 3A). This boresight direction will usually be aligned with the forward facing direction of a person wearing the WAD. However, the invention is not limited in this regard and the boresight direction can vary somewhat depending on the particular user attachment location and method.

If the signal strength of the BOCP interrogation signal does not exceed a predetermined threshold [708:NO], then the WAD can ignore the interrogation signal as indicated in step 710. In such scenarios, it can be assumed that the WAD is too far from the reader, traveling away from the reader or is traveling transverse to the reader. At this point the processing can end (or continue with other processing in step 724). In contrast, if the signal strength of the BOCP interrogation signal does exceed a predetermined threshold [708:YES], then step 712 is performed in which the WAD selectively transmits a reply signal using the BOCP, where the reply signal includes at least a unique identifier (e.g. unique identifier 210). In some embodiments, the WAD can also transmit biometric data (e.g. biometric data 214).

In optional step 714, the WAD can use its optical detector to receive a BOCP control signal from the reader. This control signal would correspond to the third information described above with respect to step 620. Thereafter in step 716 a determination is made as to whether the BOCP control signal contains address information indicating that the third information is addressed to the WAD. If not [716: NO] then the control signal can be ignored. However, if the control signal is addressed to the WAD [716: YES] then the WAD will perform operations in accordance with the control signal. These operations can include illuminating a lamp associated with the WAD (e.g. a lamp associated with indicator lamp module 262). Alternatively, these operations can include writing memory 208 access control data such as security violations associated with the particular WAD. The security violation can be accessed from the WAD at a later date and/or can be used to disable the WAD from further use as a result of such violation. In step 722, the control signal received in step 714 can be optionally acknowledged to confirm for the reader that the third information has been received and acted upon by the WAD. Thereafter step 724 is performed where method 700 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for controlling access to a restricted area, comprising:
   using a wireless optical communication link between a reader associated with an access control system (ACS) and a wearable access device (WAD) worn by a user to selectively communicate an interrogation signal directed from the reader to the WAD for initiating an access control interaction; and
   using at least one predetermined optical beam width and a boresight direction of an optical beam associated with the wireless optical communication link to facilitate a selective determination as to whether the WAD will respond to the interrogation signal with a reply signal to continue with the access control interaction.

2. The method according to claim 1, further comprising using the at least one predetermined optical beam width and boresight direction of the optical beam associated with the wireless optical communication link to facilitate a selective determination as to whether the reader will continue with the access control interaction after receiving the reply signal.

3. The method according to claim 1, wherein the wireless optical communication link is implemented using a high data rate bidirectional optical communication protocol (BOCP) to communicate digital data.

4. The method according to claim 1, wherein the BOCP is implemented in accordance with a Light Fidelity (LiFi) optical communication standard.

5. The method according to claim 1, wherein the predetermined optical beam width and boresight direction of the optical beam corresponds to at least one of an optical beam transmitted from the reader and an optical beam transmitted from the WAD.

6. The method according to claim 1, wherein the predetermined optical beam width and boresight direction of the optical beam corresponds to at least one of an optical receiving pattern of the reader, and an optical receiving pattern of the WAD.

7. The method according to claim 1, further comprising using a received signal strength indicator (RSSI) measurement of the interrogation signal at the WAD to determine whether the WAD will respond to the interrogation signal to continue with the access control interaction.

8. The method according to claim 1, further comprising using a received signal strength indicator (RSSI) measured for the reply signal sent by the WAD to the reader in response to the interrogation signal to determine whether the reader will continue with the access control interaction after receiving from the reply signal.

9. The method according to claim 1, wherein the reply signal includes at least one of a unique identifier corresponding to the WAD and a first biometric data associated with the user.

10. The method according to claim 9, wherein the first biometric data is comprised of image data.

11. The method according to claim 10, wherein the first biometric data is selected from the group consisting of facial image data and iris image data.

12. The method according to claim 9, wherein the reader includes at least one biometric scanning device which captures a second biometric data associated with the user, and wherein the method further comprises comparing the first biometric data to the second biometric data to determine whether the card is assigned to the user.

13. The method according to claim 12, wherein the biometric scanning device is a video camera.

14. The method according to claim 1, further comprising selectively controlling access control interactions between the reader and at least one said WAD by utilizing a wavelength division method to perform the wireless optical communication link.

15. The method according to claim 14, further comprising using at least one optical filter to selectively limit detection of certain wireless optical communications.

16. The method according to claim 1, wherein the optical communication link is implemented using an optical wavelength corresponding to at least one of a visible and an infrared wavelength range.

17. The method according to claim 1, wherein the optical communication link is implemented using a first optical wavelength for the interrogation signal, and a second optical wavelength for a reply to the interrogation signal generated by the WAD, and the first and second optical wavelengths are different.

18. The method according to claim 1, wherein the WAD is comprised of a planar security card and an optical detector is included on each of two opposing sides of the security card to facilitate operation of the WAD in two opposing orientations when worn by a user.

19. The method according to claim 1, wherein the access control interaction further comprises at least one data message optically communicated from the reader to the WAD following the reply signal.

20. The method according to claim 19, wherein the WAD is responsive to the at least one data message to perform at least one function at the WAD.

21. The method according to claim 20, wherein the at least one function is selected from the group consisting of illuminating a lamp, writing data to a memory location in the WAD.

22. A system for controlling access to a restricted area, comprising:
   a reader unit which is disposed at a portal to a controlled access area; and
   a wearable access device (WAD) which is worn by a user;
   the reader and the WAD configured to implement a wireless optical communication link using a high data rate bidirectional optical communication protocol (BOCP) to communicate digital data;
   wherein said WAD is configured to receive an interrogation signal from the reader for initiating an access control interaction; and
   wherein at least one of the reader and the WAD uses a predetermined optical beam width and a boresight direction of an optical beam associated with the wireless optical communication link to facilitate a selective determination as to whether the WAD will respond to the interrogation signal with a reply signal to continue with the access control interaction.

* * * * *